United States Patent [19]
Fehlner et al.

[11] 4,396,005
[45] Aug. 2, 1983

[54] SOLAR COLLECTOR AND CONTROL

[75] Inventors: Francis P. Fehlner; Arthur H. Wilder, both of Corning, N.Y.

[73] Assignee: Corning Glass Works, Corning, N.Y.

[21] Appl. No.: 281,023

[22] Filed: Jul. 6, 1981

[51] Int. Cl.³ .................................................. F24J 3/02
[52] U.S. Cl. .................................... 126/422; 126/419; 126/443; 126/417; 250/203 R
[58] Field of Search ............... 126/422, 419, 417, 443, 126/433, 425, 420; 165/32; 250/203 R; 374/55, 56, 32, 39, 41

[56] References Cited
U.S. PATENT DOCUMENTS

| 1,240,890 | 9/1917 | Shuman et al. | 126/438 X |
| 3,227,153 | 1/1966 | Godel et al. | 126/438 |
| 3,273,558 | 9/1966 | Boothe | 126/422 |
| 3,574,650 | 4/1971 | House | 250/203 R |
| 3,860,055 | 1/1975 | Wild | 126/419 X |
| 4,019,365 | 4/1977 | Woo | 374/55 X |
| 4,309,984 | 1/1982 | Dorbeck | 126/422 |
| 4,311,131 | 1/1982 | Sabet | 126/433 |

Primary Examiner—Larry Jones
Attorney, Agent, or Firm—John P. DeLuca

[57] ABSTRACT

The absorber of a solar collector expands and contracts with varying insolation. A detector responsive thereto provides indication of the absorber temperature for controlling system parameters.

18 Claims, 6 Drawing Figures

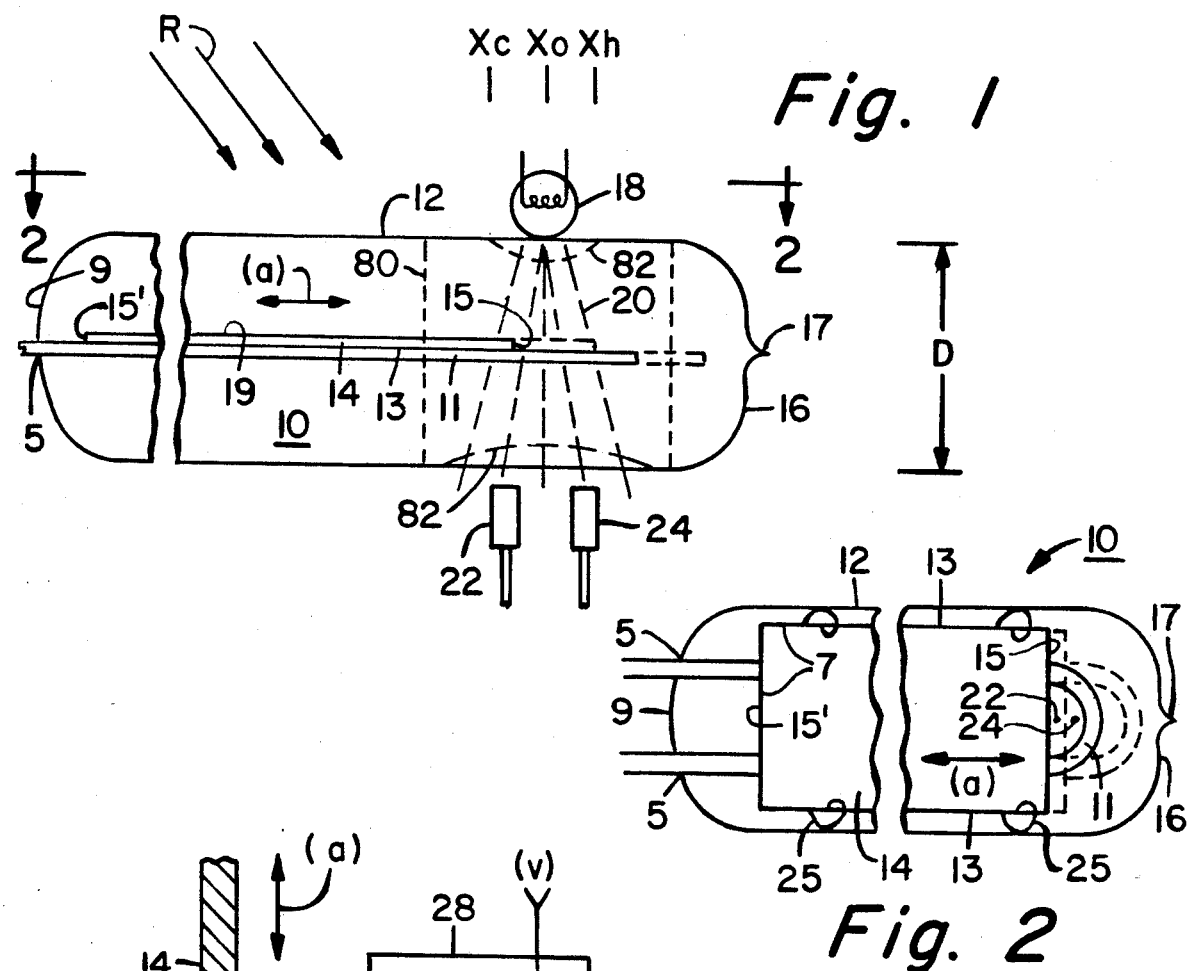
Fig. 1
Fig. 2
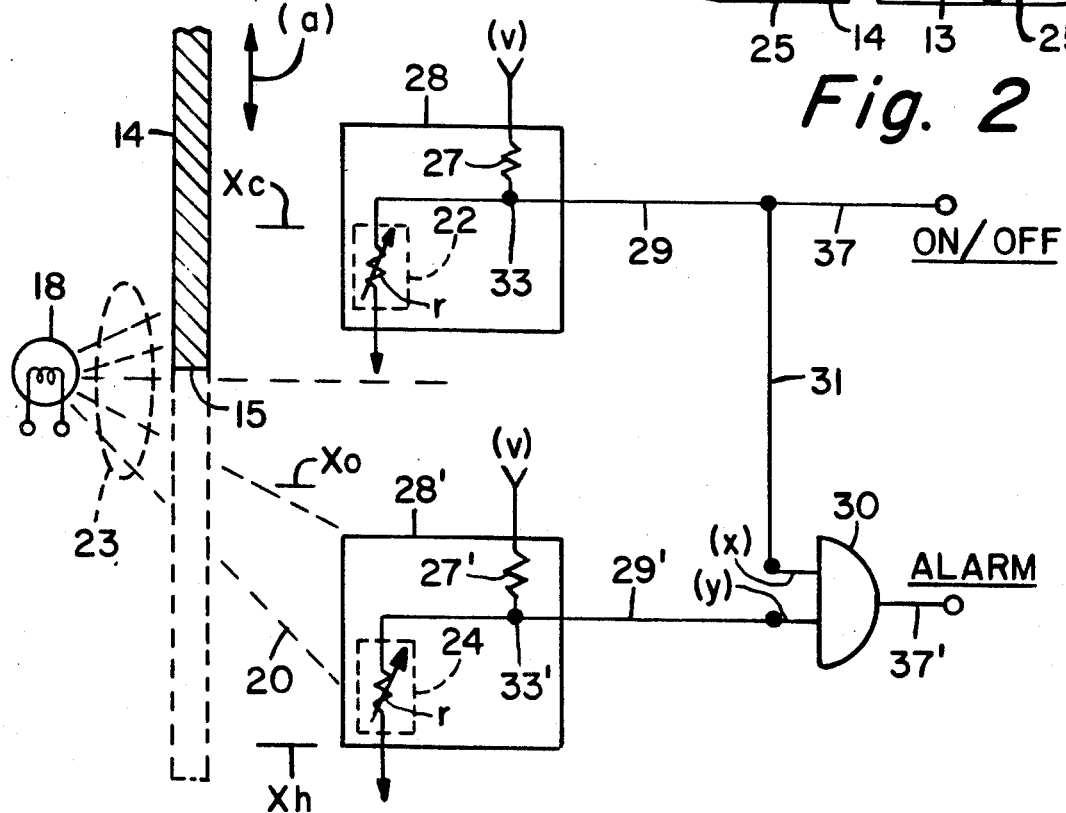
Fig. 3

SOLAR COLLECTOR AND CONTROL

BACKGROUND OF THE INVENTION

The present invention relates to a solar energy collection system and particularly to controls therefor.

In a conventional solar energy collection system a solar receiver intercepts, absorbs and converts solar radiation or insolation into sensible heat or useful thermal energy. A thermal load operatively coupled to and in heat exchange relation with the receiver utilizes the thermal energy to do work. Normally, heat exchange is accomplished by a forced circulation system including a pump for circulating a working fluid between the receiver and the load.

Typically, in a solar energy collection system, there is provided a control system including means for sensing certain critical parameters and means responsive to the sensed parameters to operate various components in accordance with a control strategy. One such critical parameter is the temperature of the receiver or more specifically an absorber surface located therein. It should be obvious that the absorber becomes heated to a useful temperature when there is sufficient sunlight. Thus, the temperature of the absorber can be sensed to determine whether or not there is sufficient input energy to start up the pump for circulating the working fluid. As sunrise, sunset and cloud cover vary throughout the year, absorber temperature sensing means may be used as a direct solar control.

In conventional systems, direct temperature sensing means have been used for the purpose of determining the temperature of the absorber. Thermocouples, resistance thermometers, bimetallic strips, and fluid expansion detectors are exemplary of devices which have been used for this purpose in the past. However, they suffer from the difficulty that they must be attached to the absorber or inserted into the receiver. The ability of such devices to actually detect the true temperature of the absorber is in question. Instruments such as pyranometers and pyroheliometers and the like that directly measure solar input have been used, but they are expensive. In the present invention linear expansion of the absorber is used to produce an accurate temperature indication.

It is well known that metal expands when heated. Copper, for example, has a linear expansion of $178 \times 10^{-7}$"/"/°C. Thus, a sufficiently long absorber plate will produce a visible lengthening when heated. In the present invention the expansion of the absorber is detected and used to accurately infer temperature. The present invention is especially adapted for use with relatively long evacuated tubular collectors, hereinafter described, wherein the lengthening of the absorber may be observed without inordinately sensitive detection equipment.

A typical evacuated tubular collector utilizes a flat rectangular absorber plate and a "U"-tube welded to one side thereof. The absorber and U-tube arrangement are located within an evacuated glass envelope transparent to solar radiation. The U-tube is a pipe bent on itself passing into and out of the envelope at one end thereof via glass to metal seals. The absorber is supported within the envelope by clips and the like. Solar radiation is intercepted and absorbed by the absorber, converted to thermal energy, and transferred by conduction to the U-tube and a working fluid passing therethrough. Although the evacuated tubular collector is preferred because it is believed to be the most efficient, it is possible to utilize the present invention with other types of collectors.

In the evacuated tubular collector, described above, it has been determined that for reasons of thermal and industrial efficiency a long, large diameter envelope would be desirable. The absorber, U-tube, glass-to-metal seals and the like being the same as above described and the absorber and U-tube being supported edgewise by clips or supports bearing against the inside wall of the envelope.

SUMMARY OF THE INVENTION

There has been provided a solar collector including a solar radiaton receiver surface or absorber for intercepting and absorbing impinging solar radiation or insolation, said insolation being variable over a solar day. The absorber converts the insolation into thermal energy or sensible heat and is susceptible to thermal expansion and contraction as a result thereof. Sensing means is remotely located from the absorber and is sensitive to expansion and contraction thereof as an insolation varies over the solar day. The sensing means produces a control output signal corresponding to one of various temperature conditions of the surface between a contracted relatively cold condition and an expanded relatively hot condition.

DESCRIPTION OF THE DRAWINGS

FIG. 1 is a schematic fragmented side view of a solar collector having a control device responsive to linear expansion of the absorber.

FIG. 2 is a top view of the collector of FIG. 1 taken along line 2—2 thereof.

FIG. 3 is a schematic circuit diagram illustrating the operation and control scheme of one embodiment of the present invention.

DESCRIPTION OF THE PREFERRED EMBODIMENTS

Figure 4:
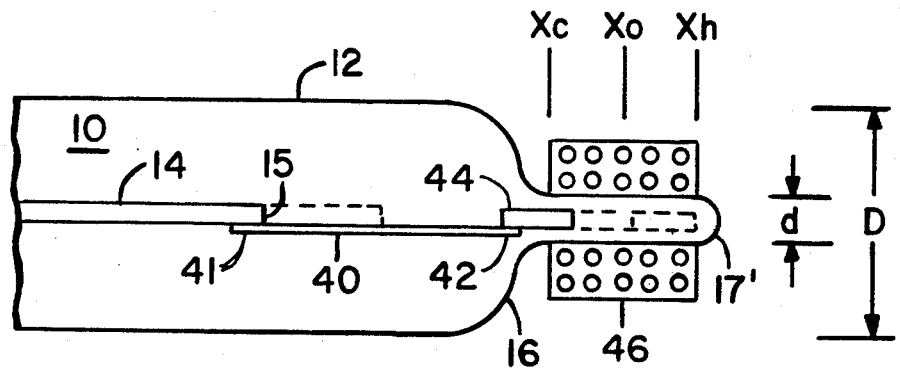
FIGS. 4, 5 and 6 illustrate variations of a solar collector utilizing the control scheme of the present invention.

In FIGS. 1 and 2, there are illustrated respective side and top fragmented views of a preferred solar collector 10 comprising an evacuated substantially transparent glass tube or envelope 12 of releatively uniform diameter D, with said tube 12 surrounding a rectangular shaped absorber 14. A metal "U" tube or conduit 11 is welded to an underside of the absorber 14 and extends lengthwise of the envelope 12. The conduit 11 passes through an inboard end 9 of the envelope 12 via glass to metal seals 5. The absorber has a selective absorber coating 19 disposed thereon for increased efficiency. The tube 12 is sealed near outboard end 16 at a tubulation 17. The absorber 14 lies in a diametric plane of the envelope 12 and has a peripheral boundary 7 coextensive with the perimeter of rectangular shaped absorber 14. The peripheral boundary 7 should be spaced with the interior walls of the envelope 11 to maximize absorber area. The peripheral boundary 7 includes opposed longitudinal margins 13, an outboard end or leading edge 15 transverse of the envelope 12 and a transverse inboard end 15' opposed to said leading edge 15. Flexible clips 25 engage lateral margins 13 of the absorber and bearing against the envelope 12 to support the absorber 14 and conduit 11 within said envelope 12.

The leading edge 15 is free to move axially of the tube 12 in the direction of the double headed arrow a. Solar radiation R impinging on the absorber 14 is intercepted, absorbed and converted into thermal energy or sensible heat causing the absorber 14 to thereby become heated.

As the absorber 14 becomes heated it expands, such that, its leading edge 15 moves between an extreme contracted position Xc (cold) and an extreme expanded position Xh (hot) shown in phantom in FIG. 1. On a normal day the absorber 14 will expand under normal or average insolation to an intermediate position Xo indicating a normal operating temperature. As insolation or radiaton R varies over the solar day the absorber 14 will expand and contract between the extremes Xc and Xh.

Referring to FIG. 1, a relatively simple device may be utilized to sense the motion of the absorber 14 as follows. A low voltage (e.g. 12 volt) small filament light source 18, located above the absorber 14 at about the position Xo, shines light 20 through the tube 12 in the direction of a pair of detectors 22 and 24 (e.g. photocells or CdS receivers). The detectors 22 and 24 are spaced axially adjacent one another near the outside of tube 12. One detector 22 is forward (to the right) of cold position Xc and the other detector 24 is rearward (to the left) of hot position Xh. As the absorber expands from Xc to Xh the leading edge 15 thereof successively blocks the light 20 to each detector 22 and 24. Each detector 22 and 24 acts as a variable resistance r responding inversely to the presence or absence of light. When coupled to appropriate circuitry, hereinafter described, detectors 22 and 24 produce outputs indicative of the length of the absorber 14.. These signals may be utilized as control signals for activating or deactivating pumps, alarms and the like.

The table below illustrates the control function or output signal relative to the position of the leading edge 15 of absorber 14.

TABLE

| Position of Absorber 14 | Temperature | Detector Resistance (r) 22 | Detector Resistance (r) 24 | Control Function |
|---|---|---|---|---|
| Xc | Cold | Low | Low | OFF |
| Xo | Operating Temperature | High | Low | ON |
| Xh | Over-Temperature | High | High | ALARM |

As the absorber 14 expands axially (to the right in FIG. 1) it first blocks light 20 to the detector 22 causing it to assume a condition indictive of the occurrence of sufficient incident solar radiation R to begin operation of a pump (not shown). At the same time detector 24 remains exposed to light 20 which indicates normal operation. Under such conditions the absorber 14 expands to about the position Xo. However, if circulation of the working fluid does not occur, the absorber 14 continues to expand beyond Xh thereby blocking light to detector 24 and indicating an alarm condition. In the event of a power failure or a failure of the light source 18, each of the detectors 22 and 24 will assume a condition which may be interpreted as an alarm condition. By known means, power to light source 18 may be monitored to refine the interpretation of the condition of detectors 22 and 24 to thereby provide indication of a power or light source failure versus the occurrence of an over-temperature condition.

It should be understood that, while it is preferred to detect the position of leading edge 15 of absorber 14, it is possible to provide holes or slots in absorber 14 aligned with detectors 22 and 24. As the absorber 14 expands and contracts, the holes move, thereby acting as a shutter-like mechanism.

In FIG. 3 there is illustrated an exemplary circuit useful for producing the outputs described above. It should be clear however that other arrangements are possible, the circuit of FIG. 3 being a simplified illustration of the concept or control strategy. The absorber 14 expands and contracts in the direction of the double headed arrow a (up and down in FIG. 3). Each detector 22 and 24 has an internal resistance r variable in response to light. The internal resistance r of the detectors 22 and 24 may change significantly in the presence and absence of light. For example the internal resistance r may change from a low resistance of 100 ohms when exposed to the light 20 to a relatively high resistance of 100 kilohms when the light 20 is blocked. In FIG. 3 detector 22 has a relatively high input resistor 27 in series therewith forming a voltage divider network 28 supplied by voltage V. An output node 33 of the voltage divider 28 between detector 22 and resistor 27 is coupled to output terminal 37 via lead 29. During the night and prior to sunrise the absorber 14 is linearly contracted and the leading edge 15 is in the Xc or cold position. Light rays 20 from the source 18 impinge on the detector 22 causing it to act as a low resistance so that the voltage at node 33 is low. Thus a low voltage appears at output terminal 37. Such a condition is interpreted as an OFF output signal. During the daytime the absorber receives insolation, heat up and expands beyond Xc, blocking light to detector 22. As the light 20 is blocked, the resistance r of detector 22 goes high thereby causing the voltage on terminal 37 to go high and thus provide an ON output signal.

Detector 24 is incorporated into a second voltage divider circuit 28' including resistor 27' in series with internal resistance r of detector 24. Output node 33' of voltage divider 23' is coupled to output terminal 37' via lead 29' and an AND gate 30. When detector 24 is illuminated its internal resistance r goes low thereby driving the voltage at node 33' low. Similarly, when the absorber 14 expands beyond Xh the light 20 is blocked and the internal resistance r of detector 24 goes high thereby producing high voltage at node 33'. A low or high voltage at node 33' could be interpreted directly as to the condition of absorber 14. However, as a check on system integrity and before an ALARM output signal is produced, there is a redundancy check. The voltage appearing at node 33 of voltage divider 28 is coupled to (x) input of AND gate 30 via leads 29 and 31. The voltage appearing at node 33' of voltage divider 28' is coupled to input (y) of the AND gate 30. The AND gate 30 produces an ALARM output signal at terminal 37' only when both inputs (x) and (y) are high indicating that both detectors 22 and 24 are blocked. Redundancy provided by AND gate 30 is a conventional control practice.

Figure 5:
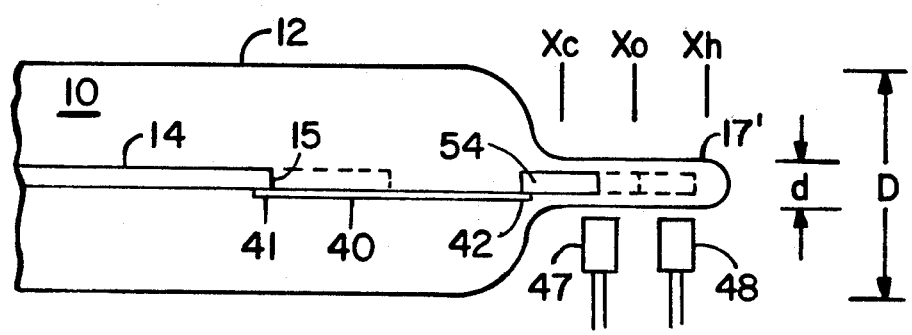
Figure 6:
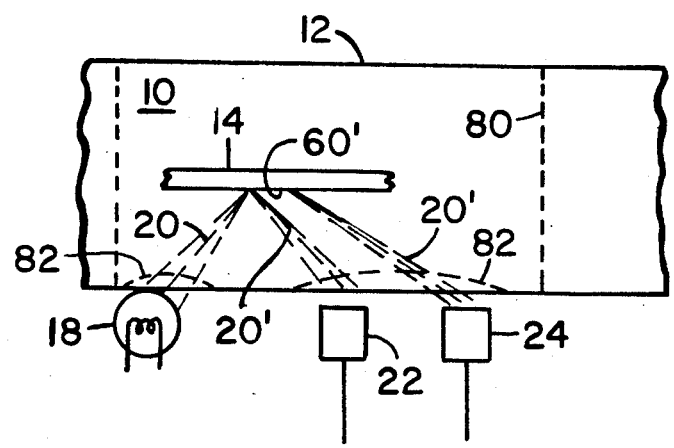

Alternative embodiments of the present invention are illustrated in FIGS. 4, 5 and 6 wherein similar elements have the same reference numerals throughout. In the collector 10 of FIG. 4 a tubulation 17' of a diameter d, reduced in size from diameter D of the envelope 12, forms as an extension from the end 16 thereof. A rod or stiff wire 40 is attached at one end 41 to the leading edge 15 of the absorber 14. The rod 40 has a free end 42 extending towards the tubulation 17'. A ferromagnetic core 44, secured to the free end 42 of the rod 40, is adapted to move axially within the tubulation 17' for providing indication of the expansion and contraction of said absorber 14. An induction coil or coil 46 is sleeved exteriorly of the envelope 12 about the tubulation 17'. As the absorber 14 expands and contracts the core 44 reciprocates axially of the coil 46. Electrical current carried by the coil 46 will vary in accordance with the position of the core 44 from Xc to Xh. Changes in current may be monitored to determine the position of the core 44 and thus the temperature of the absorber 14 to control the flow of working fluid flow or to alarm the system. If desired, an extension of the absorber (not shown) may be located in the tubulaton and the arrangement of FIG. 1 located in the vicinity of the tubulation 17' may be used to detect the position of said extension.

In another embodiment of the present invention shown in FIG. 5, of proximity switches 47 and 48 are located adjacent the tubulation 17'. The absorber 14 carries the rod 40. A magnet 54 is mounted to free end 42 of rod 40 and is axially sleeved for reciprocal motion within tubulation 17'. Proximity switches 47 and 48, located exterior of envelope 12 adjacent the tubulation 17', become actuated when the magnet 54 moves from Xc to Xh. The condition of switches 47 and 48 may be monitored to control the system as outlined above.

Another possible arrangement of the present invention is shown in FIG. 6, wherein the light source 18 is located on the same side of the absorber 14 as detectors 22 and 24. The absorber 14 has a surface portion 60 which is reflective or carries a mirror or reflective surface (not shown) for reflecting light rays 20, received from light source 18, as reflected rays 20' towards the detectors 22 and 24. Although not illustrated, other arrangements are possible including the utilization of what are believed to be relatively inexpensive solid state laser devices which may reflect coherent light off portions of the absorber 14 to an appropriate receiver. Because of the accuracy of laser transmission, such systems would be very sensitive to expansion and contraction of the absorber 14 and would, in fact, be able to detect miniscule changes in the length and/or width of the absorber 14 due to temperature variations.

It should be understood that, in order to maximize utilization of materials and enhance collector efficiency, the absorber 14 should lie in the diametric plane of the envelope 12 and have its peripheral boundary 7 as closely spaced with interior walls thereof as possible. However, because the entire absorber 14 expands when heated, the absorber 14 should be properly sized, so that, upon expansion no part thereof touches the glass. This precaution reduces thermal losses to ambience by conduction of heat energy carried by the absorber 14 through the envelope 12. The flexible support clips 25 supporting the absorber 14 are small in order to reduce conductive losses also. Since the absorber 14 is properly sized to allow for expansion without contact with the envelope 12 and the clips are flexible, stress on the envelope 12 is minimized.

The present invention is especially useful in a long evacuated tubular collector such as described in U.S. Patent application Ser. No. 280,891 filed this date and assigned the assignee of the present invention. As an example, a 24' long evacuated tubular collector operating between an ambient temperature of 50° F. and a desired operating temperature of 180° F. expands about 0.37". At a nominal alarm temperature of 350° F. the absorber expands about 0.85" from 50° F. The long evacuated tubular collector described in the copending application can easily achieve these temperatures. In a moderately good summer sky in Corning, New York a stagnation temperature of 480° F. was achieved. In a long evacuated collector, the lengthening of the absorber will be visible and thus most easily detected with the apparatus of FIGS. 1 and 2. Shorter tubes may require a more sensitive arrangement as for example shown in FIG. 4 or the laser device mentioned but not shown in respect to FIG. 6.

Although not previously mentioned the light responsive alternate embodiments of FIGS. 1 and 6 may require a shade or cover 80 to shade, block or suppress scattered ambient light from the detectors 22 and 24. The shade 80 is shown in FIGS. 1 and 3 as a pair of dotted lines and may be a paint strip or metal band located about the envelope in the vicinity of the outboard end 16 of the collector 10. Appropriate openings 82 may be provided to allow the light trap 20 and 20' (in FIG. 6) to follow the paths shown.

In FIG. 3 a lens 23 is shown in phantom to illustrate yet another embodiment of the present invention which may be preferred under certain circumstances. The lens 23 represents a light converging system for focusing the light rays 20 emminating from the source 18. A focusing device, as the lens 23, would more accurately project the light 20 and render the detectors 22 and 24 less sensitive to ambient light.

There has therefore been described what at present are considered to be the preferred embodiments of the present invention and it will be obvious to those skilled in the art that various modifications may be made therein without departing from the invention and it is intended in the appended claims to cover all such modifications that fall within the true spirit and scope of the invention.

We claim:

1. A solar collector including a solar radiaton receiver surface for intercepting and absorbing the impinging solar radiation or insolation, said insolation being variable over a solar day, said surface providing means for converting said insolation into thermal energy and being susceptible to thermal expansion and contraction as a result of becoming heated, and sensing means remotely located from said surface and responsive to the expansion and contraction of the surface as insolation varies for producing control output signals corresponding to various conditions of said surface between a contracted relatively cold condition and an expanded relatively hot condition.

2. A solar collector as set forth in claim 1 including means reponsive to the contracted condition of the absorber for producing an OFF output, the expanded condition for producing an ALARM output, and a condition intermediate the contracted and expanded condition for producing an ON output.

3. In an evacuated tubular solar collector including a closed elongated cylindrical tubular envelope transparent to solar radiation with an elongated absorber located within the envelope wherein said absorber intercepts and absorbs impinging solar radiation through said envelope and becomes heated thereby to varying temperatures as a function of the amount of radiation impinging thereon throughout a solar day, said absorber being thermally expandable and contractable within the envelope at least lengthwise from an inboard to an outboard end thereof as a result of varying temperatures, said absorber having a peripheral boundary, including longitudinal margins extending lengthwise of the tubular envelope being located near corresponding interior portions thereof, and respective inboard and outboard ends extending transverse of the envelope, said outboard end forming a leading edge being movable axially of the envelope in accordance with the expansion and contraction of the absorber with temperature, sensing means remotely located from the absorber being sensitive to movement of the leading edge of the absorber for producing output signals corresponding to the temperature of the absorber from a relatively cool contracted condition to a relatively hot expanded condition.

4. A solar collector as set forth in claim 3 wherein said sensing means comprises: a light source for producing visible light, said light source being located outside of the envelope at a selected axial position thereof near the leading edge of the absorber, said light source for projecting light transversely through the envelope, detector means located without the envelope in opposition to the light source, said detector means responsive to the light for producing outputs corresponding to respective presence and absence of light impinging thereon, the absorber being operative to expand and contract driving the leading edge of the peripheral boundary of the absorber beyond the axial position of the light source for blocking the light to the detector means when said absorber is expanded and allowing the light to impinge on the detector means when said absorber is contracted.

5. A solar collector as set forth in claim 4 wherein the light source comprises a low voltage filament light bulb and the detector means comprises a light sensitive detector.

6. A solar collector as described in claim 4 wherein the detector means comprises means for detecting a plurality of positions of the leading edge of the boundary of the absorber from a fully contracted relatively cold condition to a fully expanded relatively hot condition.

7. A solar collector as set forth in claim 4 further including shading means located in the vicinity of the light source and detector means for suppressing ambient light from striking said detectors.

8. A solar collector as set forth in claim 4 further including lens means located between the light source and detector means for focusing light emminating from said light source towards said detector means.

9. An evacuated tubular solar collector comprising: a closed wall elongated cylindrical tubular envelope transparent to solar radiation, and an elongated absorber means located therewithin for intercepting and absorbing impinging solar radiation through said envelope and becoming heated thereby to varying temperatures as a function of the amount of radiation absorbed thereby, said absorber means having a peripheral boundary relatively closely spaced with interior walls of the envelope and being thermally expandable and contractable within the envelope, the spacing of the peripheral boundary of the absorber means being sufficient to allow for said expansion without significant contact of the absorber means with the envelope, sensing means located remotely from the absorber means outside of the envelope, said sensing means being sensitive to the expansion and contraction of the absorber means for producing outputs corresponding to the temperature of the absorber means as a function of the expansion and contraction thereof.

10. A solar collector as set forth in claim 9 further including indicator means carried by the absorber means and movable therewith for providing indication of the position of said absorber means as a function of temperature.

11. A solar collector as set forth in claim 10 wherein said sensing means comprises a detector magnetically coupled with the indicator means for producing the outputs as said indicator means moves with said absorber means.

12. A solar collector as set forth in claim 11 wherein said indicator means comprises a ferromagnetic core and the magnetic detector comprises an induction coil located axially thereabout, said coil adapted for carrying an electrical current being variable in accordance with the axial position of the core.

13. A solar collector as set forth in claim 10 wherein said indicator means comprises a magnet being axially aligned with the envelope and the magnetic detector comprises switch means being located to encounter said magnet, said switch means being operative to open and close in accordance with the axial position of the magnet.

14. A solar collector as set forth in claim 10 wherein said envelope has a diameter over its length for accommodating the absorber means in spaced relation and includes an axially aligned tubulation portion of substantially reduced diameter at one end thereof for receiving the indicator means axially therein, and the detector being closely coupled with the indicator means immediately without said tubulation portion.

15. A solar collector as set forth in claim 9 including light source means for projecting light produced thereby towards said absorber means, a portion of said absorber means exposed to said projected light being light reflective for producing a significant amount of reflected light, said reflected light being variable in intensity as the absorber means moves as a result of expansion and contraction, the sensing means being sensitive to the variation in reflected light for producing the outputs corresponding to the temperature of the absorber means as said absorber means expands and contracts.

16. A solar collector as set forth in claim 15 wherein said light source is coherent.

17. A solar collector as set forth in claim 15 wherein said reflective portion of said absorber means is mirrored.

18. A solar collector as set forth in claim 15 further including shading means located in the vicinity of the light source and sensing means for suppressing ambient light from striking the said sensing means.

* * * * *

UNITED STATES PATENT AND TRADEMARK OFFICE
CERTIFICATE OF CORRECTION

PATENT NO. : 4,396,005
DATED : August 2, 1983
INVENTOR(S) : Francis P. Fehlner & Arthur H. Wilder It is certified that error appears in the above-identified patent and that said Letters Patent are hereby corrected as shown below:

Column 1, line 48, "178 x $10^{-7}$ "/"/°C. should be --178 x $10^{-7}$"/"/°C.--

Column 2, line 61, "11" should be --12--.

Column 2, line 67 "bearing" should be --bear--.

Column 3, line 52, "indictive" should be --indicative--.

Column 6, line 54, "reponsive" should be --responsive--.

Signed and Sealed this

Fifteenth Day of November 1983

[SEAL]

Attest:

Attesting Officer

GERALD J. MOSSINGHOFF

Commissioner of Patents and Trademarks